Aug. 19, 1941.   J. W. LEIGHTON   2,253,436
AUTOMOBILE SUSPENSION
Original Filed Aug. 3, 1939

INVENTOR
BY John W. Leighton.
Harness Dickey & Pierce ATTORNEYS.

Patented Aug. 19, 1941

2,253,436

UNITED STATES PATENT OFFICE 2,253,436

AUTOMOBILE SUSPENSION

John W. Leighton, Port Huron, Mich.

Original application August 3, 1939, Serial No. 288,186. Divided and this application July 12, 1940, Serial No. 345,198

4 Claims. (Cl. 280—96.2)

The invention relates generally to automobiles and it has particular relation to individual wheel suspensions. This application is a division of my copending application, Serial No. 288,186, filed August 3, 1939 on Automobile suspension.

At the present time, it is general practice to employ individual wheel suspensions in automobiles and in many instances arrangements are employed for allowing adjustments of the camber and caster angles of the kingpin. The present invention is especially concerned with devices for accomplishing this adjustment and in a more general sense with adjustable oscillatory joints.

One object of the present invention is to provide an improved and simple device for adjusting the camber and caster angles of the wheel supporting kingpin in an individual wheel suspension.

Another object of the invention is to provide an improved adjusting means of this character which is especially adapted for use in connection with a link or arm having an offset or cantileler type of projection at one end adapted to be connected to the wheel supporting member.

Another object of the invention is to provide a means for adjusting the camber or caster angle which includes a bushing, the turning of which effects the adjustment.

Another object of the invention is to provide an improved oscillatory joint including a bushing for effecting adjustments.

For a better understanding of the invention, reference may be had to the accompanying drawing forming a part of the specification, wherein.

Figure 1:
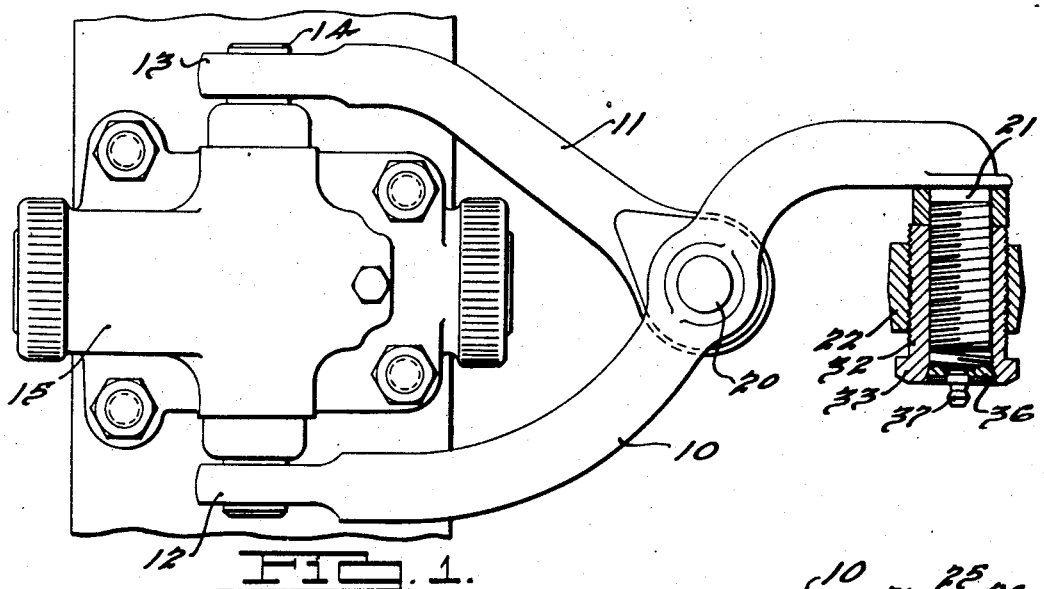
Figure 1 is a plan view partly in cross-section of an upper control arm of an individual suspension wherein one form of the invention is incorporated.
Figure 2:
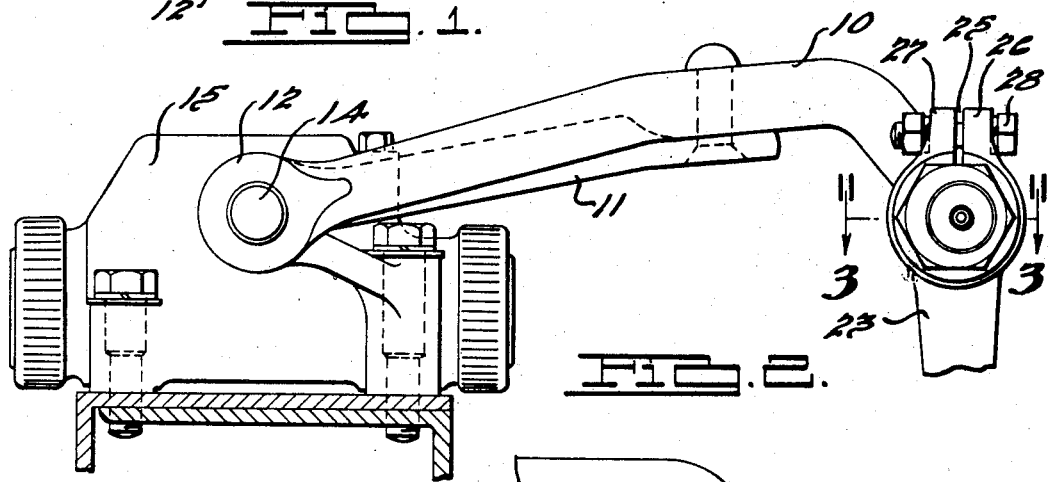
Fig. 2 is a side elevational view of the construction shown in Fig. 1.

Referring to Figs. 1 and 2, an arm is shown, in this instance constituting the upper arm of an individual suspension, which comprises a part 10 and a part 11 respectively having flattened and apertured inner ends 12 and 13. Such ends are fastened to opposite ends of a shaft 14, which controls actuation of a shock absorber 15. It will be understood that the ends of the two arms are locked to the ends of the shaft 14 and this may be accomplished in different ways such as by serrations running axially of the apertures.

The parts 10 and 11 are firmly secured together intermediate the ends of the longer part 10 by a rivet or the like 20 and part 10 beyond the connection extends outwardly and terminates in an offset, threaded projection 21 which is substantially parallel to the shaft 14. This threaded, offset end 21 projects through an eye 22 formed at the upper end of a wheel supporting member 23 and it will be understood that the lower end of the member 23 in turn is pivotally connected to a second arm or link that in turn is pivotally connected to the vehicle frame. In this connection it may be mentioned that the shock absorber is mounted on the vehicle frame so that as a consequence both arms or links are pivotally anchored to the frame. The eye 22 at the upper end of the wheel supporting member 23 is open at one side as indicated at 25 and ears 26 and 27 interconnected by bolt clamping means 28 enables drawing the two ears together so that the eye may be contracted.

Figures 3, 4:
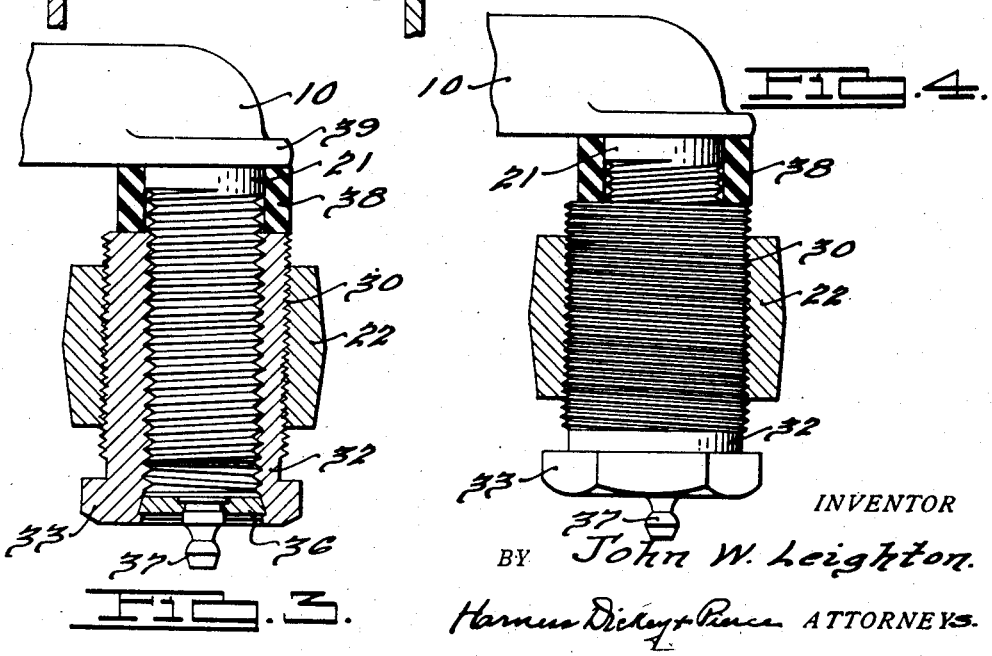
Fig. 3 is a cross-sectional view on a larger scale, taken substantially along the line 3—3 of Fig. 2.
Fig. 4 is a view substantially like Fig. 3 with the exception that the bushing is shown in full lines as distinguished from the cross-sectional view in Fig. 3.

Now directing attention to Figs. 3 and 4 in particular, it will be observed that the eye 22 is provided with internal threads 30 although these threads are finer than the threads on the offset end 21. In the present instance a double thread is employed, that is, a thread having two starting points, and the pitch of each thread is different from the pitch of the thread on the offset 21. Moreover, the threads 30 are directed oppositely to the thread on the offset 21 so that one is a left-hand thread and the other is a right-hand thread.

A bushing 32 having internal and external threads corresponding respectively to the threads on the offset end 21 and the threads 30 are threaded on to the end 21 and into the eye 22, and this bushing serves as a direct pivotal connection between the arm and the eye 22. It may be noted also that the bushing has a hexagonal head 33 for turning purposes and that the bushing is eccentric in that its outer surface is eccentric with respect to its inner surface and that turning of the bushing accordingly will move the eye 22 laterally in one direction or the other with respect to the offset end 21 so as to adjust for camber laterally of the pivotal axis. Threading of the bushing 32 also adjusts for caster since the eye 22 will travel longitudinally on the offset end 21 in one direction or the other depending upon direction of turning of the bushing. Due to the fact that the threads on the outer surface of the bushing are oppositely directed to the threads on the inner surface and also due to the fact that the pitch of such outer and inner threads is different, the eye 22 will travel with respect to the end 21 when the bushing is turned, so that adjustments can be made whenever necessary. Once the bushing is adjusted, the clamping bolt 28 is tightened so as to tightly clamp the eye about the bushing and lock it thereto so that during normal operations both the eye and bushing will turn together about the offset end 21 with the inner threads constituting the bearing. This bearing is lubricated through a Welch plug 36 having a grease fitting 37 extending therethrough and the Welch plug is fastened in the end of the bushing. A rubber washer 38 around the opposite end of the offset end 21 and which contacts the end of the bushing and also a shoulder 39 on the arm prevents lubricant from escaping and also prevents dirt from getting into the bearing.

Initially, in assembling the parts, the eye 22 is forcibly spread sufficiently that the bushing may be moved thereto without requiring the threading of the bushing into position. It follows that in assembling the joint, the eye 22 may be spread or enlarged, then moved over the offset end 21, and that then the bushing may be threaded onto the offset end while avoiding threading engagement with the eye. Following this procedure, the eye may be contracted by means of the clamping bolt so as to bring the outer threads into operating engagement. When the bolt is tightened sufficiently the bushing becomes locked in the eye and turns therewith, but upon loosening the bolt to a certain extent, the bushing may be turned in one direction or the other which moves it through the eye in one axial direction and in the opposite axial direction on the offset end, thereby changing the relative positions of the eye and arm axially of the end 21, and hence changing the caster angle of the kingpin, it being understood that the connection between the other end of the member 23 and the other arm or link is such as to permit tilting or angling of the member 23. The camber angle may be adjusted at the same time since turning of the bushing moves the eye inwardly or outwardly depending on the degree of turning. The arrangement is simple, may be readily assembled, and may be readily adjusted whenever necessary.

Although only one form of the invention has been illustrated and described in detail, it will be apparent to those skilled in the art that various modifications may be made without departing from the scope of the appended claims.

What is claimed is:

1. In an individual wheel springing for motor vehicles, a laterally projecting link member adapted to be pivotally connected to the vehicle frame, a wheel mounting member, and an oscillatory joint for connecting the members comprising an inner trunnion non-turnably fixed on one member and extending longitudinally of the vehicle and provided with external threads, a bushing threaded internally and externally and having pivotal, threaded bearing engagement with the trunnion threads, an outer internally threaded part fixed on the other member and threaded on to the outer threads of the bushing, and means for adjustably locking the outer part to the bushing so that normally they turn together relative to the trunnion, the threads at the inner surface of the bushing being directed oppositely and being of a different pitch as compared to the threads at the outer surface of the bushing, so that with the locking means loosened, turning of the bushing relative to the trunnion and outer part causes such trunnion and part to travel rapidly but relatively along the axis of the bushing whereby the caster angle of the wheel mounting member may be varied.

2. In an individual wheel springing for motor vehicles, a laterally projecting link member adapted to be pivotally connected to the vehicle frame, a wheel mounting member, and an oscillatory joint for connecting the members comprising an inner trunnion non-turnably fixed on one member and extending longitudinally of the vehicle and provided with external threads, a bushing threaded internally and externally and having pivotal, threaded bearing engagement with the trunnion threads, an outer internally threaded part fixed on the other member and threaded on to the outer threads of the bushing, and means for adjustably locking the outer part to the bushing so that normally they turn together relative to the trunnion, the threads at the inner surface of the bushing being directed oppositely to the threads at the outer surface of the bushing, so that with the locking means loosened, turning of the bushing relative to the trunnions and outer part causes such trunnion and part to travel rapidly but relatively along the axis of the bushing whereby the caster angle of the wheel mounting member may be varied.

3. In an individual wheel springing for motor vehicles, a laterally projecting link member adapted to be pivotally connected to the vehicle frame, a wheel mounting member, and an oscillatory joint for connecting the members comprising an inner trunnion non-turnably fixed on one member and extending longitudinally of the vehicle and provided with external threads, a bushing threaded internally and externally and having pivotal, threaded bearing engagement with the trunnion threads, an outer internally threaded part fixed on the other member and threaded on to the outer threads of the bushing, and means for adjustably locking the outer part to the bushing so that normally they turn together relative to the trunnion, the threads at the inner surface of the bushing being of a pitch different from that of the threads at the outer surface of the bushing, so that with the locking means loosened, turning of the bushing relative to the trunnion and outer part causes such trunnion and part to travel rapidly but relatively along the axis of the bushing whereby the caster angle of the wheel mounting member may be varied.

4. In an individual wheel springing for motor vehicles, a laterally projecting link member adapted to be pivotally connected to the vehicle frame, a wheel mounting member, and an oscillatory joint for connecting the members comprising an inner trunnion non-turnably fixed on one member and extending longitudinally of the vehicle and provided with external threads, a bushing threaded internally and externally and having pivotal, threaded bearing engagement with the trunnion threads, an outer internally threaded tubular part on the other member and being axially slotted at one side so that the part may be clampingly contracted, said part being threaded onto the outer threads of the bushing, and means for releasably clamping said part about the bushing so as to bind the threaded surfaces against relative turning, said threads between the outer part and the outer surface of the bushing being directed in an axial direction different from the threads between the bushing and trunnion so that with the clamping means loosened, turning of the bushing relative to the trunnion and outer part causes such trunnion and part to travel relatively along the axis of the bushing whereby the members may be adjusted axially of the bushing as to relative positions and then locked for relative pivotal movement in the different positions of adjustment, the parts being so constructed and arranged that locking of the outer part to the bushing does not interfere with the pivotal threaded bearing engagement between the bushing and trunnion, the threads between the outer part and the bushing being of normal acute angle character so as to permit easy turning of the bushing in the outer part when the clamping means is released, the wall of the bushing being annular in character so that clamping of the outer part thereabout will not interfere with the pivotal threaded bearing engagement between the bushing and trunnion.

JOHN W. LEIGHTON.